United States Patent [19]

Tanaka et al.

[11] Patent Number: 4,654,523

[45] Date of Patent: Mar. 31, 1987

[54] LIGHT-REFLECTOR TYPE ENCODING METHOD AND THE ENCODER

[75] Inventors: Toshiyasu Tanaka; Sadakazu Ariga, both of Yokohama, Japan

[73] Assignee: E. I. Du Pont de Nemours and Company, Wilmington, Del.

[21] Appl. No.: 678,596

[22] Filed: Dec. 4, 1984

[30] Foreign Application Priority Data

Dec. 5, 1983 [JP] Japan .................. 58-229653
May 9, 1984 [JP] Japan .................. 59-90868

[51] Int. Cl.⁴ .......................... G01D 5/34
[52] U.S. Cl. ................... 250/231 SE; 250/227; 250/237 G
[58] Field of Search ........... 250/227, 231 SE, 237 G; 340/347 P; 356/395

[56] References Cited

U.S. PATENT DOCUMENTS

| 4,162,399 | 7/1979 | Hudson | 250/227 X |
| 4,176,276 | 11/1979 | Kaul et al. | 356/395 X |
| 4,503,326 | 3/1985 | Searle | 250/227 |

Primary Examiner—Eugene R. LaRoche
Assistant Examiner—James C. Lee

[57] ABSTRACT

A light-reflector type encoding method which comprises emitting light from one end of an optical fiber to a mobile body which moves relatively to said end of the optical fiber, through an optical lattice disposed at a fixed position relatively to said fiber end, receiving the reflected light from at least plural light-reflective graduations provided in the light-emitted zone of said mobile body through the optical lattice, and detecting the received reflected light with a photoelectric conversion element connected to the other end of the optical fiber. The present invention also provides a light-reflective type encoder suitable for carrying out the encoding method.

30 Claims, 9 Drawing Figures

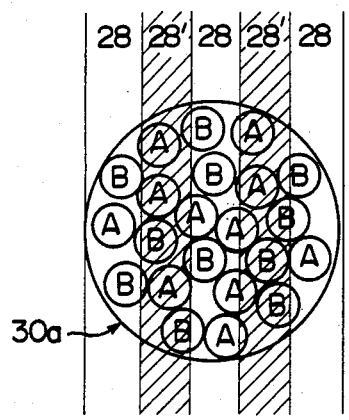
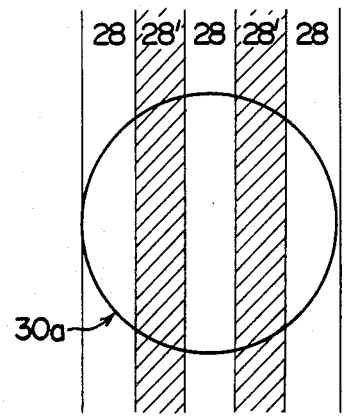
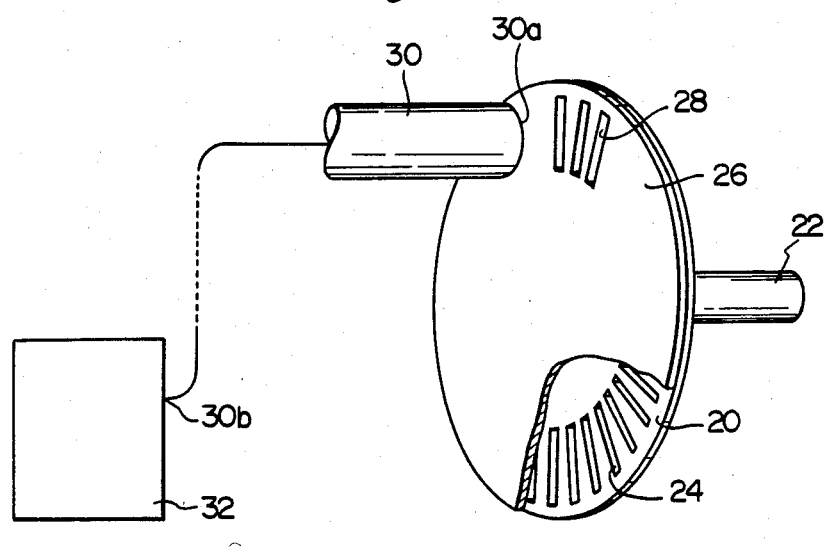

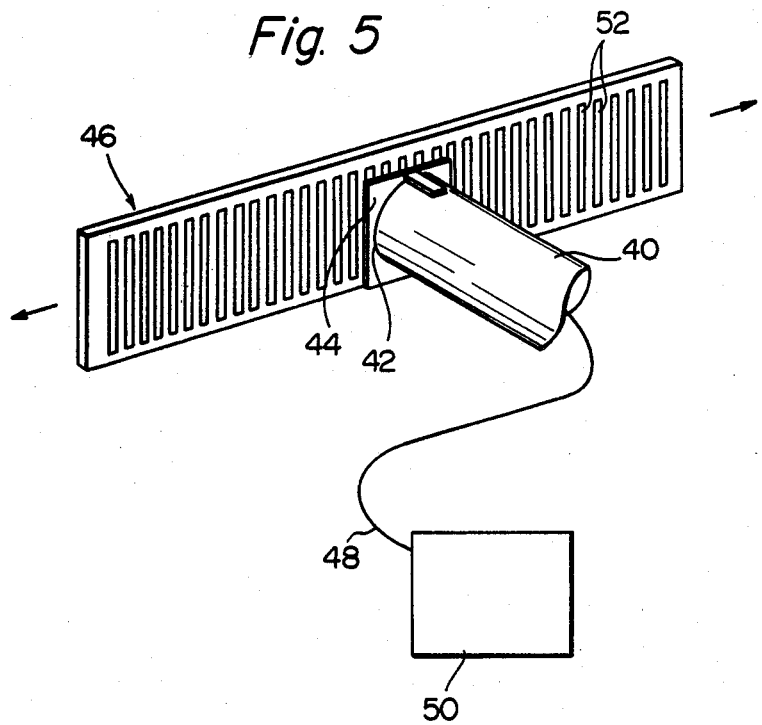
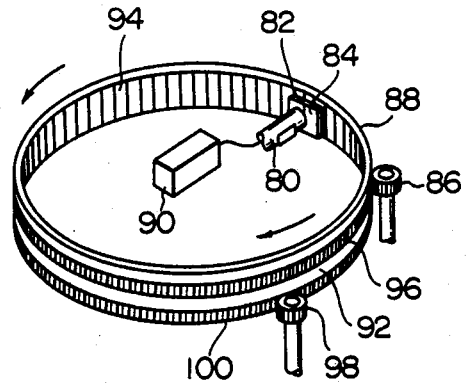

LIGHT-REFLECTOR TYPE ENCODING METHOD AND THE ENCODER

BACKGROUND OF THE INVENTION

1. Field of the Invention

This invention relates to a light-reflector-type encoding method and the light-reflector-type encoder. More particularly, the invention relates to a method and apparatus for encoding the kinetic variation to be detected of the subject under detection by optical signals, through the motion of a mobile body which moves in response to the motion of said subject, by emitting light from one end of an optical fiber or a bundle of plural optical fibers (which will be hereinafter referred to simply as an optical fiber) on a mobile body which moves in response to the kinetic variation to be detected of the subject under detection, and receiving the light reflected by the mobile body at the same end of said optical fiber.

2. Description of the Related Art

Heretofore, the most generally employed encoder includes a graduated board and electronic parts such as light-emitting and light-receiving elements. This type of encoder has a number of drawbacks. It is easily adversely affected by electric noise, temperature and humidity; it is incapable of precise measurement; requires anti-fire and anti-explosion provisions if it is used in equipments around which use of fire must be avoided; and it is useless for long-distance signal transmission because of the voltage drop or electric distortion.

An optical encoder has been proposed, in which the pulse output is converted to optical signals, in an attempt to eliminate such drawbacks of conventional encoders in which the pulse output is electric signals.

Japanese Official Patent Gazette, Publication No. 52640/82 disclosed an optical encoder comprising a luminous source emitting two-phase rectangular waves having mutually a phase difference of 90° at ω-frequency, a code disc with slits to let pass the two types of light beams from said source, the first optical fiber having two front ends to receive a part of the two light beams before they transmit through said slits, a phase board having phase slits which is fixedly disposed paralleling with said code disc and the second optical fiber having two front ends to receive the two light beams transmitted through said phase slits, said two light beams being emitted from said light source against the code disc and received by said front ends of two optical fibers before and after they pass through the code disc and phase board, and the motion of a subject under detection which is connected to said code disc being detected by comparing those quantities of light.

In the optical encoder disclosed in the above noted Publication No. 52640/82, however, optical fibers must be disposed at both front and back of the slitted disc to receive the light beams emitted from the luminous source. This in turn makes it necessary to install near the slitted disc a means for mechanically connecting the slitted disc with the subject under detection, so that the disc can move in relation to the motion of said subject. Installation of such a means causes designing difficulty. Furthermore, because the prior art encoder requires a means for receiving both the emitted light and transmitted light, it can neither be miniaturized nor can perform precise measurement of the subject's motion.

Separately, Laid-Open Patent Publication No. 87,818/81 proposed a light-reflector type encoder which dispensed with the transmitted light or the means to receive that light. However, the encoder disclosed in this publication has other drawbacks. For example, in order to detect the variation in the light-reflectivity to precisely determine the position of the subject under detection with this prior art encoder, a graduated board connected with the subject is used, and a light of the width less than that of the individual graduation is projected and the reflectivity of this light varying with the movement of said graduated board must be detected. Consequently, if the width of graduations is narrowed to improve the precision, the width of the optical fiber for projecting light on the graduations must also be narrowed in response thereto, and also the distance between the end of the optical fiber and the moving graduated board must be precisely controlled to regulate the extremely fine light-emitted area.

As the width of the optical fiber is lessened, however, the transmission of effective quantity of light becomes more difficult, increasing the difficulty in precise positional detection. Again, when the graduation width is drastically narrowed, it becomes difficult or impossible to give identical width, form and reflectivity to all of the great number of graduations on the board, which obviously renders the precise positional detection difficult.

SUMMARY OF THE INVENTION

An object of the present invention is to provide a novel light-reflector-type encoding method and an encoder, adopting a system wherein the light is emitted from one end of an optical fiber, through an optical lattice fixedly disposed relative to said fiber end, to light-reflective graduations on a mobile body which moves relative to said optical fiber.

Another object of the present invention is to provide a novel light-reflector-type encoding method and an encoder, adopting a system in which the light is emitted from one end of an optical fiber, through said optical lattice, to at least plural light-reflective graduations on said mobile body, and the reflected light from said plural graduations is received by said end of optical fiber, through said optical lattice.

A further object of the present invention is to provide a novel light-reflector-type encoding method and an encoder in which a light, of which at least one of the optical properties for defining said light, e.g., reflectivity, spectrum or the like, changes with a certain regularity, is caused to be generated as a reflected light from the mobile body, through an optical lattice fixedly disposed relative to the optical fiber, and the motion of the subject under detection, which is connected to the mobile body, is encoded by detecting the regular change in the reflected light through the optical fiber.

A still further object of the present invention is to provide a light-reflector-type encoding method and an encoder in which the error in detecting the variation in the motion of the subject under detection, caused by minor differences in individual graduation width, form or reflectivity, for example, an error in positional detection, is very little.

A still further object of the present invention is to provide a light-reflector-type encoding method and an encoder in which an optical fiber can be disposed at a single direction opposite to the mobile body for detecting the subject's position, with graduations interposed therebetween.

Another object of the present invention is to provide a light-reflector-type encoding method and an encoder which can simultaneously detect not only the precise position varying incidentally to the motion of the mobile body, but also any fixed positions within the cycle of said motion.

Still further objects and advantages of this invention will become apparent from the following descriptions.

According to the present invention, the foregoing objects and advantages are accomplished by the light-reflector type encoding method which is characterized in that light is emitted from one end of an optical fiber, through an optical lattice fixedly positioned relatively to said fiber end, to a mobile body which moves relatively to said fiber end, the reflected light from at least plural light-reflective graduations provided on said light-emitted zone of the mobile body is received by said end of the optical fiber through said optical lattice, and so received reflected light is detected by a photoelectric conversion element connected to the other end of the optical fiber.

BRIEF DESCRIPTION OF THE DRAWINGS

FIGS. 3a and 3b are the schematic explanatory views showing the relation between the graduations on the optical lattice or the first member and the one end of the optical fiber, seen from the optical lattice side.

FIG. 4 is a simplified view of a light-reflector type encoder according to the first example of this invention.

FIG. 5 is a simplified view of a light-reflector type encoder according to the second example of this invention.

FIG. 7 is a simplified view of a light-reflector type encoder according to the fourth example of this invention.

DESCRIPTION OF THE PREFERRED EMBODIMENTS

Figure 1A:
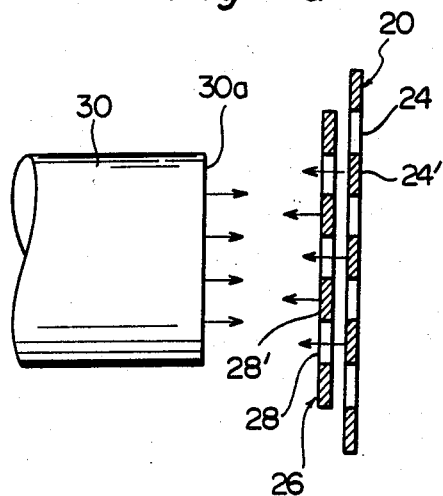
FIGS. 1a and 1b are the explanatory diagrams showing the state of emitting light from one end of an optical fiber onto a mobile body or the second member, through an optical lattice or the first member, and receiving the reflected light, in accordance with the present invention.

In the method of the present invention, the light is emitted on the mobile body from one end of an optical fiber, through an optical lattice. If it is emitted from the one end of the optical fiber directly on the mobile body, that is, not through the optical lattice, such precise detection as achieved by the present invention can never be expected.

According to the invention, the optical lattice must be disposed fixedly relative to said end of the optical fiber, while the mobile body needs to move relatively to the optical fiber. That is, the relative positional relationship between the end of the optical fiber and the optical lattice is fixed, while that between said fiber end and the mobile body connected to the subject under detection is not fixed, i.e., relatively mobile.

Accordingly, so long as the optical lattice and the mobile body maintain the above-described positional relationship with the end of optical fiber, said fiber end and optical lattice are not necessarily static while the mobile body is in motion, but the former two may be in concert motion maintaining the fixed positional relationship while the mobile body remains static or in a different motion from that of the former two.

The of the present invention resides in the emission of light onto a mobile body which moves relatively to one end of an optical fiber in response to the motion of a subject under detection, through an optical lattice which is fixedly disposed relatively to said end of the optical fiber, as abovedescribed. By the use of such an optical lattice, it is made possible to emit light on plural light-reflective graduations on the mobile body to detect the motion of the subject under detection, through the inspection of the motion of mobile body, whereby controlling the motion of said subject.

Hereinafter the invention will be described mainly as to the above-described embodiment, but it should be understood that the one end of the optical fiber and the optical lattice fixedly disposed relative to said fiber end may be connected to the subject under detection and move in response to the motion of said subject, while the mobile body remains static or in different motion from that of the subject.

The in this invention is to emit the light transmitted through the optical lattice on at least plural light-reflective graduations provided in the light-emitted zone of the mobile body.

That is, according to the present invention employing such an optical lattice, it is made possible to detect the motion of the mobile body even when the light is emitted on plural light-reflective graduations on the mobile body as above-described. On the other hand, by emitting light on a plurality of the light-reflective graduations on the mobile body, the difference in the reflected light caused by the very minor differences in form, size and width among the individual graduations is rendered substantially insignificant, allowing the precise detection of the subject's motion irrespective of possible errors in form, size and width among the individual graduations on the mobile body. Again, the emission of light on plural light-reflective graduations on the mobile body makes it possible to increase the quantity of light emitted from one end of the optical fiber and to ultimately increase the quantity of the reflected light from the graduations, allowing an extremely precise detection of the motion of the mobile body which moves in response to the motion of the subject under detection.

The of the present invention resides in the reception of reflected light from the plural light-reflective graduations on the mobile body by the end of the optical fiber, through the light-transmittable graduations on the optical lattice. That is, the emission of light onto the mobile body and the reception of the reflected light from the mobile body is performed by one and same end of an optical fiber, through an optical lattice which is fixed relatively to said fiber end. Thus the path of the emitted light and that of the reflected light become identical, although reversed in direction, and it becomes possible to effectively utilize the light for detecting the motion of the mobile body, simply by centering the one end of the optical fiber against the light-emitted zone of the mobile body connected to the subject under detection.

Furthermore, because the optical fiber can be placed on single side opposite to that at which the subject under detection is disposed, in relation to the mobile body which moves in response to the change in the motion of said subject, the mechanical connection of the subject under detection with the mobile body is rendered extremely easy, and miniaturization of the apparatus also can be facilitated.

According to the method of the present invention, the reflected light from the mobile body received by said fiber end is detected by a photoelectric conversion element connected to the other end of the optical fiber.

Figure 1B:
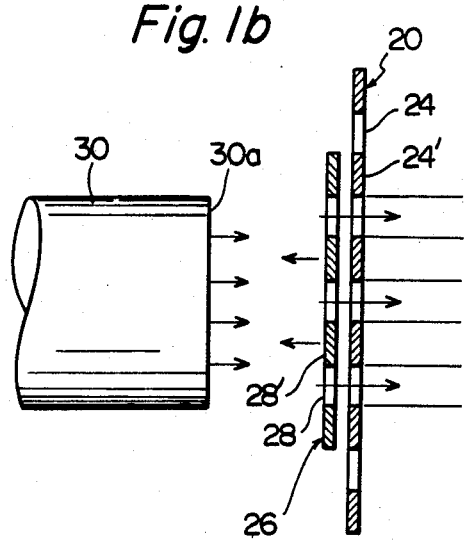
Figure 2:
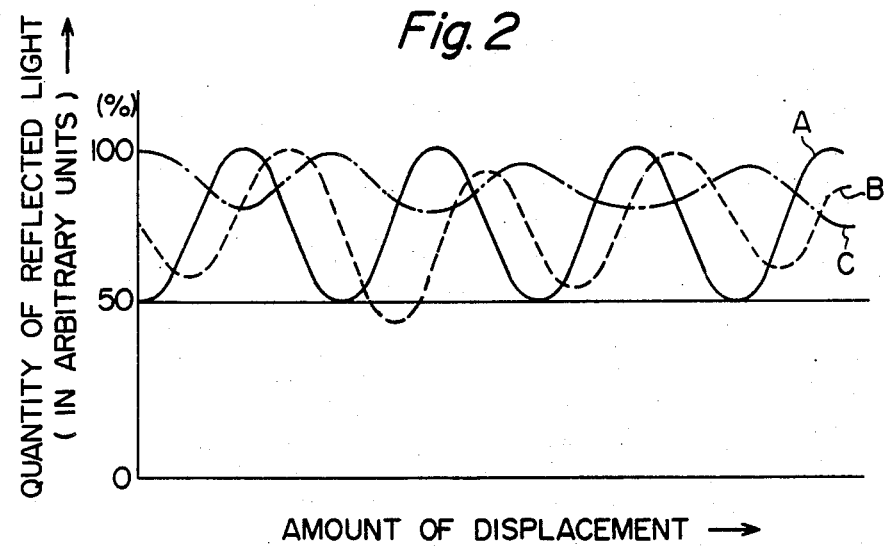
FIG. 2 is a schematic, explanatory diagram showing the correlation of the amount of shift of the mobile body or the second member and the quantitative variation in the reflected light, caught by the encoder of this invention (curve A). The curves B and C are those obtained with the methods or encoders different from the present invention.

The reason why the motion of the mobile body connected to the subject under detection can be precisely detected by the method of this invention will be more specifically explained, referring to the attached drawings, FIGS. 1a, 1b and 2.

FIGS. 1a and 1b schematically show the light emitted from one end of an optical fiber onto the light-emitted zone of the mobile body through the optical lattice, and reflected by plural reflective graduations on said body, the reflected light again transmitting through the optical lattice and being received by said end of the optical fiber.

In FIGS. 1a and 1b, the optical lattice 26 has two types of graduations of different light-transmittances, i.e., light-transmittable graduations 28 and substantially non-light-transmittable, reflective graduations 28', alternately arranged. Whereas, the mobile body 20 has the two types of graduations having different reflectivities, i.e., light-reflective graduations 24 and substantially non-light-reflective graduations 24' which are preferably light-transmittable, alternately arranged. Those four types of graduations are advantageously identical in shape, and can be at least superposed with one another.

According to FIG. 1a the luminous flux emitted from the end 30a of an optical fiber 30 against the optical lattic 26 fixedly disposed relative to said end 30a (the arrows from 30a pointing right in the drawing) is partly reflected by the graduations 28' (the arrows from 26 pointing left) when it reaches the optical lattice 26, and the rest transmits through the graduations 28 of optical lattice 26, to reach the plural graduations 24 on the mobile body 20 to be reflected (the arrows from 24 pointing left). The reflected light again transmits through the optical lattice 26 to return to (to be received by) the end 30a of the optical fiber 30.

According to FIG. 1b, it will be understood that the luminous flux emitted from the end 30a of optical fiber 30 against the optical lattice 26 is partly reflected by the graduations 28' similarly to the case of FIG. 1a the rest transmitting through the graduations 28 and also through plural graduations 24' on the mobile body 20 (the arrows from 20 pointing right). Therefore, under the state illustrated in FIG. 1b only a part of the luminous flux originally emitted from the end 30a of optical fiber 30 against the optical lattice 26, i.e., only the reflected light by the graduations 28' on optical lattice 26, returns to the fiber end 30a.

In the state illustrated in FIGS. 1a and 1b if same quantity of light is emitted from the optical fiber end 30a, the quantity of the reflected light received by said end 30a in FIG. 1a and that in FIG. 1b differ clearly.

According to the invention, the optical lattice is fixedly disposed relative to the end 30a of optical fiber 30, while the mobile body 20 moves relative to the same fiber end 30a. Therefore in the actual operation the relation between the graduations on the optical lattice 26 and those on the mobile body 20 continuously changes from the state of FIG. 1a to that of FIG. 1b or vice versa, accompanying the relative movement of the mobile body 20, and consequently the quantity of reflected light also continuously changes incidentally thereto.

Thus according to the present invention, for example, if the repetition of the continuous change between the state of FIG. 1a and that of FIG. 1b is represented graphically, taking the amount of displacement of the mobile body with said optical fiber end on the axis of abscissae and the quantity of reflected light, on the axis of ordinates, a curved line indicating the quantity of reflected light with a constant cycle can be obtained as shown in FIG. 2.

Therefore, by detecting such a curve of the reflected light with a photoelectric conversion element connected to the other end of the optical fiber, the amount of displacement of the mobile body which moves in response to the change in the motion of the subject under detection, namely the change in the motion of the subject itself, can be precisely detected.

According to the method of this invention, the light from one end of the optical fiber is emitted first against the optical lattice fixedly disposed relative to said fiber end, as aforesaid. The optical lattice has the graduations of different light-transmittances and therefore does not transmit light through all of the light-emitted zone, but transmits light only through its light-transmittable graduations occupying a part of said zone. Said graduations may consist of, for example, those of high light-transmittance and those of low light-transmittance. The former may be slits which let pass the emitted light substantially as it is, or may be the transparent base of the optical lattice itself. Also the graduations of low light-transmittance may substantially absorb and/or scatter the emitted light, which may be, for example, the material itself of the optical lattice having substantially no transmittance, or may be formed on the surface of the optical lattice with a substance having substantially no ability to transmit light, for example, paint, when the optical lattice is made of a highly light-transmittable material. It is also possible to make the optical lattice surface to scatter or absorb substantially all of the emitted light, for example by making it aventurine.

The optical lattice should have at least one, preferably at least two, graduations of high light-transmittance. More preferably, it has plural graduations having high light-transmittance (for example, 2–100) and plural graduations having low light-transmittance (e.g. 2–100), which are alternately arranged. In the optical lattice, preferably the graduations of high light-transmittance and those of low light-transmittance are regularly arranged, and more preferably the light-transmittable graduations and substantially non-light-transmittable graduations are alternately and regularly arranged. If both types of the graduations are plural, they may be substantially identical or different in form, size and width, etc., substantially identical ones being preferred.

The light transmitted through the optical lattice is emitted on at least plural light-reflective graduations on the lighted zone of the mobile body which moves in response to the motion of the subject under detection, reflected thereby, again transmits through the optical lattice, and is received by one end of the optical fiber.

The reflective graduations on the mobile body can consist of, for example, graduations of different reflectivities, e.g., those of high reflectivity and those of low reflectivity; or consists of those reflecting the emitted light as the reflection lights having mutually different spectra. The graduations having different reflectivities may consist of, if white light is to be emitted, those having a high reflectivity painted with highly bright white or silver paint, and those having a low reflectivity painted with light-absorbing black color or gray. The latter graduations may be the light-transmittable slits provided on the mobile body. Also, either one type of the graduations may be formed of the base of the mobile body itself.

As the graduations reflecting the emitted light as the reflected lights of different spectra, for example, those simply reflecting the light having substantially the same spectrum to that of the emitted light, such as the reflective graduations substantially incapable of absorbing light within the wavelength region of the emitted light; graduations which absorb the light of specific wavelength or wavelength region within the emitted light and reflect the remainder, e.g., those absorbing blue light alone of white light and reflecting the rest; or the graduations having wavelength-shifting ability such as those reflecting white light as fluorescent light; may be suitably used.

When such graduations are used, the movement of the mobile body relevant to that of the subject under detection can be detected, by inspecting the spectra of the reflected lights, e.g., detecting the intensity of light at specific wavelength or wavelength region.

According to the present invention, the graduations of the optical lattice and those of the mobile body have such a relationship that the reflected light received at one end of the optical fiber possesses a certain regularity capable of specifying the motion of the mobile body relative to said fiber end. So long as such a relationship is maintained, the number, form, size, width, etc. of the graduations on the optical lattice as well as those on the mobile body, are optional. For example, the form of the graduations may be linear, a polygon such as a slender quadrilateral, e.g., a rectangle, regular tetragon or triangle, or a round shape such as circle or oval. The size of the graduations may be a polygon with the length of shorter side or one side ranging from the order of microns to several millimeters or a round shape with the diameter or shorter diameter ranging from the order of microns to several millimeters. Preferred form of the graduations is linear or rectangular, because such can be densely formed.

The relations between the graduations on the optical lattice and those on the mobile body producing a certain regularity in the reflected light is such that, preferably, the intervals among the light-transmittable graduations on the optical lattice, or the lattice pitch, can superpose with the light-reflective graduations on the mobile body which moves relatively to the optical lattice, substantially in the same direction, optically and regularly. A typical such a relationship is that between the graduations on the optical lattice wherein light-transmittable linear graduations having a-$\mu$-shorter sides and non-light-transmittable (reflective) linear graduations having a-$\mu$-shorter sides are alternately disposed with the longer sides serving as the borders, and the graduations on the mobile body wherein reflective, linear or rectangular graduations with a-$\mu$-shorter sides and light-transmittable, linear or rectangular graduations with a-$\mu$-shorter sides are alternately disposed with the longer sides serving as the borders. In an another example, to the optical lattice having the above-described graduations, the mobile body has the graduations wherein reflective, rectanglar graduations with 2a-$\mu$-shorter sides and light-transmittable, rectangular graduations with a-$\mu$-shorter sides are alternately disposed, with their longer sides serving as the borders.

The graduations on the optical lattice can also consist of a light-transmittable, rectangular graduation with a-$\mu$-shorter sides, a non-light-transmittable (reflective), rectangular graduation with b-$\mu$-shorter side, a light-transmittable, rectangular graduation with c-$\mu$-shorter side, and a non-light transmittable (reflective), rectangular graduation with d-$\mu$-shorter side disposed side by side by the order stated, with their longer sides serving as the borders, while the graduations on the mobile body consist also of the above four types of graduations disposed side by side by the order stated, and appearing cyclically.

According to the subject method, the light transmitted through the optical lattice is emitted on the mobile body which moves relatively to the optical fiber. Therefore, it is possible according to this invention to make one end of an optical fiber static, and to emit light from the static fiber end on at least plural reflective graduations on the mobile body, through an optical lattice fixedly disposed against the static fiber end. Alternatively, the light may be emitted from one end of a moving optical fiber, through an optical lattice fixedly disposed against the fiber end, on at least plural reflective graduations on a static mobile body or the body making a different motion from that of the optical fiber. In the latter case, if the fiber end and the mobile body make different movements, included are such embodiments wherein the two move in mutually opposite directions, or move in a same direction with different speeds. The motion may be any that performed with a certain regularity, for example, a rectilinear motion, curvilinear motion or rotatory motion. The reflected light from the plural reflective graduations on the mobile body is received by the aforesaid optical fiber end, through the optical lattice, and detected by the photoelectric conversion element connected to the other end of the optical fiber as aforesaid.

A preferred embodiment of this invention comprises emitting light from one end of optical fiber, through at least two graduations having high light-transmittance of an optical lattice fixedly disposed relative to said fiber end, on at least two light-reflective graduations on the mobile body, receiving the light, which is reflected by said light-reflective graduations and transmitted through at least two graduations on the optical lattice, by said end of the optical fiber, and detecting thus received reflected light with a photoelectric conversion element connected to other end of the optical fiber.

By such a method it is made possible to catch the light reflected by the plural graduations on the mobile body always as the standardized light, at one end of the optical fiber, regardless the minor deviations in width, shape, reflection characteristics such as reflectivity, among said graduations. Thus the positional variation of the mobile body, and consequently the variation in the motion of the subject under detection, can be detected with extremely high precision.

According to the present invention, furthermore, the above-described objects and advantages can be accomplished by a light-reflector type encoder which comprises (A) an optical fiber, an optical lattice disposed fixedly relatively to one end of said optical fiber (which will be hereinafter referred to as the first member), and a mobile body which is movable relatively to said one end of the optical fiber (which will be referred to as the second member), (B) the second member being provided, on its surface facing the first member, with graduations having differing light-reflectivities, (C) the first member being provided, at the position faceable with said graduations on the second member, with the graduations having differing light-transmittances, (D) one end of the optical fiber being disposed at a position opposite to the graduations on the first member, so that the light from a light source can be emitted on plural graduations on the second member through the graduations on the first member, and the light reflected by said graduations on the second member can be received by the same end of the optical fiber; and the other end of the optical fiber being connected to a photoelectric conversion element.

The encoder of the present invention comprises an optical fiber, the first member (optical lattice) disposed fixedly relatively to one end of said optical fiber, and the second member (mobile body) movable relatively to said end of the optical fiber.

The optical fiber can be a single optical fiber composed of a core and clad, e.g., step-type or focusing type, or a bundle of optical fibers composed of plural strands of single optical fiber composed of a core and clad (which will be hereinafter collectively referred to as an optical fiber). Such optical fibers are known per se, and commercially available.

The first member may be mounted on said end of the optical fiber or installed spaced from said fiber end, so long as it is disposed fixedly relatively to said fiber end.

The first member may assume various forms, e.g., film, plate, disc, cylinder or a rod with circular cross-section.

The second member again may take various forms, e.g., film, plate, disc, cylinder or a rod with circular cross-section.

In the encoder of the present invention comprising the first member disposed fixedly relatively to one end of an optical fiber and the second member movable relatively to said fiber end, the first member may be a static, fixed body and the second member, a mobile body which is connected to the subject under detection and moves in response to the motion of said subject, or the second member may be a static, fixed body, and the first member, a mobile body connected to the subject under detection and moves in response to the motion of said subject, or either one of the first or second member may be connected to the subject under detection and is a mobile body which moves in response to the motion of said subject, and the other member may also be a mobile body making a controlled motion.

In the above-disclosed encoder of this invention, it is preferred that the first and second members should move with a certain regularity, for example, a rectilinear motion, curvilinear motion or rotatory motion, etc.

Therefore, in the encoder of this invention, the first and second members may make a rotatory movement relatively to each other, or a rectilinear or curvilinear motion, also in relative terms.

The second member has, on the surface opposing the first member, graduations having differing light-reflectivities, and the first member has, at the place faceable with said graduations on the second member, graduations having differing light-transmittances. Shape, size, width and mutual relations, etc. of these graduations are already described concerning the method of this invention.

In the encoder of this invention, one end of the optical fiber is disposed at the position opposite to the graduations of the first member (optical lattice). As already stated, said end of the optical fiber must be so disposed that it can emit the light from the light source, through the graduation on the first member, preferably at least two light-transmittable graduations, on at least two graduations on the second member, and also can receive the light-reflected by at least two reflective graduations on said second member.

This will be more specifically explained, referring to FIGS. 3a and 3b.

FIG. 3a shows, schematically, the fiber end, seen from the axial direction of said fiber, through the optical lattice disposed fixedly relatively to said fiber end. On said end 30a, for example, twenty-two strands of optical fibers A and B are present at random. The optical fibers A signify the fibers for emitting light toward the optical lattice, and the optical fibers B, the fibers for receiving the reflected light from the reflective graduations on the second member (not shown, which is understood to be located in front of the drawing).

Again, the optical lattice has, for example, light-transmittable graduations 28 and light-reflective graduations 28'.

At the state illustrated in FIG. 3a, the light emitted from the optical fibers A transmits through the optical lattice at the plural graduations 28, but is reflected by the optical lattice at the plural graduations 28' and received by the optical fibers B. The light transmitted through the graduations 28 of the optical lattice reaches the second member, and if the light-reflective graduations on the second member are located there, is reflected to again transmit through the graduations 28 of the optical lattice and to be received by the optical fibers B facing said graduations 28. Whereas, if the light-transmittable graduations on the second member are located there, the light transmits therethrough, not to come back to the optical fiber.

Therefore, if the other ends of the optical fibers A are combined into a bundle and connected to a light source to transmit light, and also the other ends of the optical fibers B are combined into a separate bundle and connected to a photoelectric conversion element to allow detection of the reflected light, the reflected light will show a constant, systematic variation accompanying the motion of the second member (cf. FIG. 2). By detecting the variation, therefore, the motion of the second member which moves in response to the motion of the subject can be detected. Consequently, the motion of said subject itself can be detected.

FIG. 3b shows, schematically, the state similar to that illustrated in FIG. 3a, except that the optical fiber is a single fiber. In this case also the light is emitted through the end 30a of the optical fiber, transmitting through the light-transmittable graduations 28 of the optical lattice but being reflected at the graduations 28' and received by the same fiber end 30a. The light transmitted through the graduations 28 of the optical lattice is either reflected by the light-reflective graduations of the second member (not shown) or transmits through the light-transmittable graduations, similarly to the case of FIG. 3a.

In this case also, therefore, the reflected light received at the end 30a of the optical fiber shows the constant, systematic variation accompanying the motion of the second member. Hence, for example, if the other end of the optical fiber is branched, one being connected to the light source and the other, to a photoelectric conversion element, the movement of the subject under detection can be determined similarly to the case of FIG. 3a.

In FIGS. 3a and 3b, the optical fiber may be step-type or focusing type as aforesaid, and said end of the optical fiber may be substantially flat, or convex, e.g., a curved surface such as convex lens, convex ellipsoid or convex sphere. The convex, curved surfaces are like those formed by a liquid at the front end of a capillary tube. Such a surface can be easily formed by fusing said end of the optical fiber. It can be also understood that, if an optical path-changing element such as a lens, mirror or prism is placed between said fiber end and the first member disposed statically relatively to said fiber end (an optical lattice), still the light emitted from the fiber end transmits through the optical path-changing element to reach the graduations of the first member and partly, the graduations of the second member, and the light reflected by the graduations of the second member again transmits through the graduations of the first member and the optical path-changing element to be received by said end of the optical fiber.

Thus it is also within the scope of this invention to interpose an optical path-changing element.

Further according to this invention, the above-enumerated objects and advantages of the present invention can be advantageously accomplished by the light-reflector type encodoer which comprises (A) an optical fiber, a fixed body disposed fixedly relatively to one end of the optical fiber, and a mobile body which is connected to the subject under detection and can move in response to the motion of said subject, (B) said mobile body being provided, on its surface facing the fixed body, with at least plural graduations of substantially constant width but having different light-reflectivities, (C) said fixed body being provided, on at least a part of the place corresponding to the graduations on the mobile body, with the graduations in which two types of graduations having different light-transmittances are alternately disposed and which superpose with the graduations on the mobile body with optical regularity, (D) said one end of the optical fiber, which is capable of emitting the light from the light source on plural graduations on the mobile body through plural graduations on the fixed body, and also receiving the reflected light from said graduations on the mobile body, being positioned opposite to the graduations on the fixed body, and the other end of the optical fiber being connectable to a photoelectric conversion element.

In the above-described encoder, the graduations on the mobile body can move systematically relatively to the graduations provided on the fixed body, in response to the motion of the subject under detection, and the mobile body preferably is a rotator.

If the mobile body is a rotator, preferably it has the graduations of differing light-reflectivities and of substantially constant width, on the surface facing the fixed body, along the circumference of a hypothetical circle having an identical radius from the center of rotation axis.

Again, when the mobile body is a rotator, a rotator having two types of graduations of different light reflectivities which are provided on the surface of the rotatory plate facing the fixed body, along the circumferences of at least two hypothetical circles of different radii from the center of rotation axis; and a fixed body having preferably at least two graduations having different light-transmittances and superposing with said graduations on the rotatory plate optically with regularity, provided on at least a part of the place facing the rotatory plate, can be used.

With such a rotator and fixed body, it is possible to detect, for example, simultaneously with the positional detection of the rotator by means of the reflected light from the plural graduations provided along the circumference of the first hypothetical circle on the rotator, the position of the rotator also by means of the reflected light from plural graduations along the circumference or circumferences of second or more of the hypothetical circles. This allows very precise detection of the rotator's position, and consequently, very precise detection of the motion of the subject under detection which is connected to said rotator. Furthermore, the direction of rotation or absolute position of the rotator can be precisely detected, which enables to know and control the absolute position of the subject under detection, from a place distant from said subject.

Hereinafter the subject method and the encoder will be more concretely explained, referring to the attached drawings.

The first example of this invention will be explained, referring to FIGS. 4, 1a and 1b.

FIG. 4 is an explanatory diagram of the light-reflector type encoder in accordance with the first example of this invention, in which, 20 is a rotatory plate, which is connected to the subject under detection (not shown) such as, for example, a motor of various apparatuses, by means of a shaft 22, or the like. On the surface of said plate 20, a large number of light-transmittable graduations 24 are provided at an identical pitch, spaced from the center of the rotation axis by a substantially same radius. In the illustrated model, the graduations 24 are the slits, which allow the light to pass through, whereby providing so to speak a reflectivity different from that of the surface of the rotatory plate 20. Obviously it is possible to form the graduations 24 from a material having a different light-reflectivity from that of the surface of the rotatory plate 20, as previously explained. In that case, the interspaces among the graduations 24 should be understood to serve as the graduations of different light-reflectivity.

Further, in the drawing, 26 is a fixed body (optical lattice) fixedly disposed relatively to the end 30a of an optical fiber 30, which is made of a disc of equal diameter with that of the rotatory disc 20 and installed coaxially and non-contactingly adjacent to said rotatory disc 20, and plural light-transmittable graduations 28 are provided thereon, along a part of the circumference of a hypothetical circle of equal radius from the center of rotation axis with that supposed in providing the graduations 24 on the rotatory disc 20, at the identical pitch with that of the graduations 24. The number of graduations 28 is determined in relation to the size of the area emitted by the light from the later-described optical fiber 30. Incidentally, in the illustrated model the graduations 28 on the fixed plate 26 are slits, but obviously they may be made of a material of higher light-transmittance than that of the surface of the fixed plate 26, as already explained. In this case also the interspaces among the graduations 28 should be understood to serve as the light-reflective graduations. The fixed plate 26 not necessarily has the same shape with that of rotatory plate 20, but may have the size and shape corresponding to those of the light-emitted area.

An optical fiber 30 is disposed with its one end 30a facing with the graduations 28 on the fixed plate 26, and the other end 30b connected to an optical signal-processing means 32. As aforesaid, this optical fiber 30 may be a single strand of optical fiber or a bundle of plural strands of optical fiber. The optical fiber 30 emits the light from the light source within the optical signal-processing means 32 onto the graduations 28 on the fixed body 26, and also receives the light reflected from the surface of the fixed plate 26, etc. and transmits it to the optical signal-processing means 32. Said end 30a of the optical fiber 30 is worked in advance to emit light on plural graduations 28 on the fixed plate 26, in correspondence to the denier size of the optical fiber.

The optical signal-processing means 32 accommodates the light source and photoelectric conversion element for transducing the light to electric signals which are not shown, such means per se being known.

The light-reflector type encoder having the described structure operates as follows. Light is emitted from one end 30a of the optical fiber 30, toward the plural graduations 28 on the fixed plate 26. If the graduations 24 on the rotatory plate 20 and the graduations 28 on the fixed plate 26 are in discrepancy with each other at the moment (cf. FIG. 1a), the light emitted from the optical fiber 30 is reflected by almost entire lighted area. When subsequently the rotatory plate 20 rotates by the distance of half a graduation, the graduations 24 and 28 superpose with each other (cf. FIG. 1b) and a part of the light emitted from the optical fiber 30 transmits through the graduations 28 on the fixed plate 26 and the graduations 24 on the rotary plate 20, and the remnant of the light emitted on the surface of the fixed plate 26 is reflected. And, when the rotatory plate 20 further rotates by the distance of another half a graduation, the graduations 24 and 28 again become discrepant with each other, and the light is reflected by approximately entirety of the emitted area. Thus, during the rotatory plate's rotation by the distance of one graduation, the light-reflectivity varies by one cycle, and this variation is detected by the optical signal-processing means 32 through the optical fiber 30, to confirm that the subject under detection rotated by the predetermined angle.

In the above-described first example, the end 30a of the optical fiber 30 is placed opposite to a statically installed plate 26, and the other member, i.e., the rotatory plate 20, is rotated in response to the motion of the subject under detection. An equivalent function can be obtained by fixedly connecting the optical fiber end 30a and the graduations on the fixed plate 26, rotating the fixed plate 26 around its center axis in response to the motion of the subject under detection, and installing a member equivalent to the rotatory plate 20 in static state. In this case, such a structure can be employed wherein the optical signal-processing means 32 and the other end 30b of the optical fiber 30 are also statically installed, and the optical fiber end 30a and the fixed plate 26 are rotated.

Now a light-reflector type encoder, e.g., a position detector, according to the second example of this invention will be explained, referring to FIG. 5.

The device comprises a statically disposed optical fiber 40, a static, graduated plate 44 which is fixed on one end 42 of the optical fiber 40 and serves as the first member, a shifting, graduated plate 46 which shifts in longitudinal direction in correspondence to the motion of the subject under detection, and an optical signal-processing means 50 which is connected to the other end 48 of the optical fiber 40.

The shifting, graduated plate 46 is formed of a long rectangular plate, and provided with the graduations formed at a uniform pitch and composed of two materials of different light reflectivities, as illustrated. Said plate 46 shifts in the direction indicated by the arrow, i.e., the longitudinal direction, in correspondence to the motion of the subject under detection.

A static, graduated plate 44 is fixed on one end 42 of the optical fiber 40, at a position facing with the graduations 52 of the shifting, graduated plate 46. Thus, the optical fiber 40, static, graduated plate 44 and the optical signal-processing means 50 are statically installed at fixed positions.

This device according to the second example operates similarly to the aforesaid device according to the first example. That is, the shifting, graduated plate 46 moves in the longitudinal direction, in response to the motion of the subject under inspection. Accompanying this shift, the reflectivity of the light emitted from the end 42 of the optical fiber 40 onto the shifting, graduated plate 46, through the static, graduated plate 44, varies. By receiving the reflected light at said end 42 of the optical fiber 40 and processing the optical signal with the optical signal-processing means 50, the position of the subject can be detected.

In the above device according to the second example, the shifting, graduated plate 46 moves in response to the motion of the subject under detection, but the structure may be so modified that said plate 46 is statically installed at a fixed position, and the optical fiber end 42 and the static, graduated plate 44 fixed thereon are moved in response to the motion of the subject under inspection.

Figure 6:
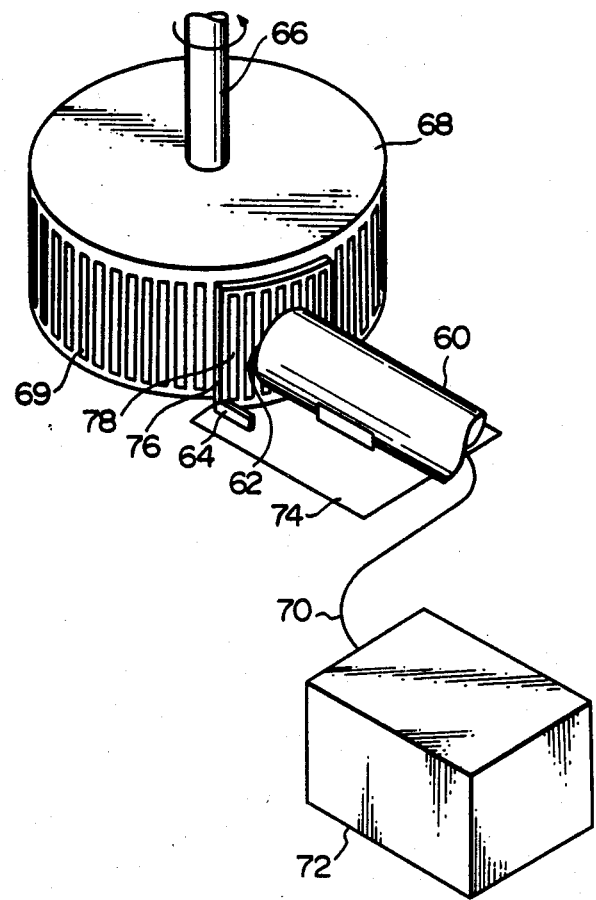
FIG. 6 is a simplified view of a light-reflector type encoder according to the third example of this invention.

Now a light-reflector type encoder in accordance with the third example of this invention will be explained, referring to FIG. 6.

This device comprises an optical fiber 60, a graduated member 64 fixedly installed relatively to one end 62 of said optical fiber 60, a rotatory, graduated member 68 which is connected to the subject under inspection through a shaft 66 or the like, and an optical signal-processing means 72 connected to the other end 70 of the optical fiber 60.

The rotatory, graduated member 68 is columnar, and has the graduations 69 provided at an equal pitch and formed of the materials of different reflectivities, on its outer peripheral surface. As aforesaid, this member 68 is connected to the subject under inspection through a shaft 66 or the like, and rotates in response to the motion of said subject.

The end 62 of the optical fiber 60 is fixed on a supporting plate 74, and the graduated member 64 also is fixed on the supporting plate 74. Thus the graduated member 64 is fixedly installed relatively to the end 62 of the optical fiber 60. The graduated member 64 is composed of a supporting frame 76 and a film 78 which is supported by said frame 76. The film 78 is provided with vertical stripes which are alternately transparent and nontransparent, serving as the graduations of differing light-transmittances. These graduations on the film 78 have the identical pitch with that of the graduations 69 on the rotatory, graduated member 68.

The other end 70 of the optical fiber 60 is connected to the optical signal-processing means 72, similarly to the previous example.

This device according to the third example again operates similarly to the devices according to the first and second examples, and can detect the position of the subject, by the rotation of the rotatory, graduated member 68 in response to the motion of the subject under detection.

Now a light-reflector type encoder according to the fourth specific example of this invention will be explained, referring to FIG. 7.

This device comprises an optical fiber 80, the first graduated member 84 installed fixedly relatively to the end 82 of said optical fiber 80, the second graduated member 88 which is connected to the subject under detection, through a pinion 86, an optical signal-processing means 90 which can have the similar structure to that of those employed in the foregoing examples, and a disc-formed supporting base 92 for supporting the optical fiber 80, etc.

The second graduated member 88 is cylindrical, and rotatably supported on the disc-formed supporting base 92 so that it can rotate around the center axis of said base 92. Graduations 94 made of the materials of different reflectivities are formed on the upper part of the internal side of the second member 88, and the lower part of the outer peripheral surface of said member is a gear 96 which engages with the pinion 86 for conducting the motion of the subject under detection. Thus the second graduated member 88 is rotated in response to the motion of said subject.

On the disc-formed supporting base 92, the optical fiber 80, the first graduated member 84 and the optical signal-processing means 90 are fixedly installed. Thus the first member 84 is positioned fixedly relatively to the end 82 of the optical fiber 80 and also faces the graduations 94 on the second member 88. The disc-formed supporting base 92 can rotate around its center axis, and its lower part of the outer peripheral surface is formed into a gear 100. Said gear 100, for example, engages with a pinion 98 which rotates in the reversed direction from that of the pinion 86 but at an equal angular velocity, in response to the motion of the subject under detection.

In this device according to the fourth specific example, the first member 84 and the second member 88 rotate in reverse directions at an equal angular velocity, in response to the motion of the subject under detection. Thus it is made possible to detect the position of the subject, with the precision twice higher than that of the case wherein either one of the members is fixed.

It is also feasible to rotate the first member 84 in response to the motion of the subject under detection, while the second member 88 is rotated in the same or opposite direction at a constant speed or any optional speed. Whereupon it becomes possible to detect the position of the subject relatively to a predetermined standard point under motion, which is determined depending on the rotation speed of the second member 88.

FIG. 2 shows the variation in the quantity of reflected light in relation to, for example, the rotation of rotatory plate 20, as described earlier. In the graph, the curve A denotes, for example, the state of variation in the Example shown in FIG. 4, wherein the optical fiber 30 is installed on the side of the fixed plate 26. In this case, even if the flatness on the surface of fixed plate 26 is nonuniform, the quantity of reflected light from said surface shows always a constant value, stabilizing the minimum value. Consequently the absolute amplitude of the variation ratio becomes large, allowing sure detection of the variation in the quantity of the reflected light, and hence, of the positional variation of the subject under inspection.

Whereas, the curve B in FIG. 2 shows the state of variation in the quantity of reflected light, when the optical fiber 30 is installed on the side of the rotatory plate 20. That is, when the optical fiber 30 is installed on the side of the rotatory plate 20 and emission and reflection of light are effected, because the flatness of the surface of the plate 20 is imperfect and the space between the end of the optical fiber and the rotator varies accompanying the rotation, the position and angle of the graduations on the plate 20 change. Consequently the quantity of reflected light varies with the rotation of plate 20, and the maximum and minimum quantities of reflected light become unstable, reducing the absolute amplitude of the quantitative variation of the reflected light, and the sure positional detection of the subject cannot be effected.

Again the curve C in FIG. 2 shows the quantitative variation of reflected light, when a light having an emission area corresponding to the width of plural graduations is emitted in the conventional light-reflector type positional detector, in which, instead of using a graduated plate fixedly installed relative to one end of an optical fiber, a single sheet of graduated plate is shifted against said end of the optical fiber to effect the positional detection. In that case, not only the minimum and maximum values vary depending on the degree of flatness of the surface of the graduated plate 11, but the amplitude of variation in the quantity of reflected light is small, rendering a precise positional detection nearly impossible.

Furthermore, in the present invention the number of graduations on the first member (optical lattice) has no substantial influence on the quantitative variation ratio in the reflected light. Therefore, it is entirely optional to enlarge the emission area for obtaining a large quantity of light, to reduce the individual graduation width on the first member for more finely dividing the graduations on the second member, or to reduce the pitch of the graduations.

As so far described, according to the present invention the amplitude of variation in the reflected light can be enlarged by receiving the reflected light from at least two light-reflective graduations on the mobile body, at one end of the optical fiber, and furthermore the minimum and maximum values can be always maintained at substantially constant level. Therefore the variation in the motion of the subject under inspection can be detected with large, stable signals, and hence the variation in the subject's motion can be precisely detected.

According to the present invention, any motions of any subjects can be detected, as long as the subject can move or be shifted relatively to one end of an optical fiber. Variation in any motions, for example, those in the subject's position, pressure, velocity, volume and the like, can be detected, by converting the motion to that of the second member (mobile body).

Such motions of a subject under inspection can be converted to those of the mobile body, by conducting the variation in the motion of the subject to the mobile body, by any optional physical, mechanical or physicochemical means.

What we claimed is:

1. A light-reflector encoding method for detecting the variation in motion of a subject comprising the steps of:
   emitting light from one end of an optical fiber through an optical lattice to a mobile body which is moving relative to the end of the optical fiber, said optical lattice disposed at a fixed position relative to the one end of the optical fiber, said mobile body including a plurality of graduations having alternately differing light-reflectivities and said optical lattice including a plurality of graduations having alternately differing light transmittances capable of superposing optically and regularly with the graduations on the mobile body.
   receiving at said one end of the optical fiber light which is reflected by the light-reflective graduations of said mobile body which is transmitted through the graduations on said optical lattice, and
   detecting the reflected light with a photoelectric conversion element connected to the other end of the optical fiber.

2. The method according to claim 1, in which said one end of the optical fiber is static.

3. The method according to claim 1 in which said one end of the optical fiber is in motion and and said mobile body is either static or in different motion from that of the optical fiber.

4. The method according to claim 1 in which the light-transmittable graduations on the optical lattice are capable of superposing optically and regularly with the reflective graduations on the mobile body moving relative thereto, in the substantially identical direction with that of the motion of said graduations on the mobile body.

5. The method according to claim 1 in which the reflective graduations provided on said mobile body include graduations having high light-reflectivity and those having low light-reflectivity.

6. The method according to claim 1 in which the light-reflective graduations provided on said mobile body include graduations which reflects the emitted light as reflected lights of different spectra.

7. The method according to claim 1, in which said mobile body is connected to the subject under detection, and moves in response to the motion of said subject.

8. The method according to claim 1 in which graduations of high light-transmittance and graduations of low light-transmittance are systematically arranged on the optical lattice.

9. The method according to claim 1 in which light-transmittable graduations and substantially non-light-transmittable graduations are alternately and regularly arranged on the optical lattice.

10. The method according to claim 1, in which light is emitted, in relation to the motion of the mobile body, from one end of an optical fiber to at least two light-reflective graduations on the mobile body, through at least two highly light-transmittable graduations on the optical lattice which is fixed relatively to said end of the optical fiber, and the reflected light from those light-reflective graduations is received by said end of the optical fiber through at least two of said graduations on the optical lattice.

11. A light-reflector type encoder for detecting the variation in motion of a subject, comprising:
    an optical fiber element;
    a first member disposed at one end of the optical fiber element, the relative position of the first member and the end of said fiber element remaining fixed during operation of the encoder;
    a second member disposed so that the first member is positioned between the second member and the optical fiber element at said one end of the element, the relative position of the second member and the end of said fiber element varying during operation of the encoder;
    a plurality of graduations having differing light-reflectivities located on a surface of said second member facing said first member;
    a plurality of graduations having differing light transmittances located on a surface of said first member facing the graduations on the surface of said second member;
    one of either said first member or said second member being connected to the subject under detection and moving in response to the motion of said subject; and
    a photoelectric conversion means disposed at the other end of the optical fiber element; said one end of the optical fiber element being capable of emitting light from a source onto the graduations on the surface of the second member through the graduations on the surface of the first member, and being capable of receiving light reflected from the graduations on the surface of the second member and transmitting the reflected light to said photoelectric conversion means.

12. The encoder according to claim 11, in which the first member is a static, fixed body and the second member is a mobile body which is connected to the subject under detection and moves in response to the motion of said subject.

13. The encoder according to claim 11, in which the second member is a static, fixed body and the first member is a mobile body which is connected to the subject under detection and moves in response to the motion of said subject.

14. The encoder according to claim 11, in which either one of the first and second members is a mobile body which is connected to the subject under detection and moves in response to the motion of said subject, and the other member also is a mobile body performing a controlled motion.

15. The encoder according to claim 11 in which the second member is a rotator.

16. The encoder according to claim 11, in which the second member is a film or plate.

17. The encoder according to claim 11, in which the second member is a cylinder or a rod having circular cross-section.

18. The encoder according to claim 11, in which the second member is a disc.

19. The encoder according to claim 11, in which the first member is any of film, plate, disc, cylinder or a rod having circuit cross-section.

20. The encoder according to claim 11, in which the first member is mounted on the optical fiber element at the latter's one end facing the second member.

21. The encoder according to claim 11, in which the optical fiber element is a single strand of an optical fiber element.

22. The encoder according to claim 11, in which the optical fiber element is a bundle of plural strands of an optical fiber.

23. The encoder according to claim 11, in which the first and second members make rotatory motion relatively to each other.

24. The encoder according to claim 11, in which the first and second members make a rectilinear or curvilinear motion relatively to each other.

25. A light-reflector type encoder for detecting the variation in motion of a subject comprising:
an optical fiber element;
a static body disposed at a fixed position relative to one end of the optical fiber element;
a mobile body connected to the subject under detection and moving in response to the motion of said subject;
a plurality of graduations having substantially constant width and differing light reflectivities located on a surface of the mobile body facing the static body;
a plurality of graduations having differing light transmittances located on at least a portion of a surface of the static body, said graduations on the static body capable of superposing optically and regularly with the graduation on the mobile body; and
a photoelectric conversion element means being connectable to the other end of the optical fiber, said one end of the optical fiber being capable of emitting light from a source onto the graduations on the mobile body through the graduation of the static body, and being capable of receiving the light reflected from the graduations on the mobile body which are disposed at a position opposite to the graduation on the static body and transmitting the reflected light to the photoelectric conversion element.

26. The encoder according to claim 25, in which the graduations on the mobile body make a systematic movement relatively to the graduations provided on the fixed body, in response to the motion of the subject under detection.

27. The encoder according to claim 25, in which the mobile body is a rotatory plate.

28. The encoder according to claim 25, in which the graduations of substantially constant width and different light-reflectivities are provided on the surface of the rotatory plate facing the static body, along the circumference of a hypothetical circle of a same radius from the center of rotation axis.

29. The encoder according to claim 28, in which the rotatory plate is provided, on its surface facing said static body, with the graduations having substantially different light-reflectivities, along the circumferences of at least two hypothetical circles of different radii from the center of rotation axis, and the fixed body is provided, on at least a part of its surface corresponding to the rotatory plate, with the graduations having different light-transmittances which optically and regularly superpose on the aforesaid graduations on the rotatory plate provided along the circumferences of at least two hypothetical circles.

30. The encoder according to claim 28, in which the rotatory plate is provided, on its surface facing the static body, with the light-reflective graduations having a width at least that of the light-transmittable graduations on the fixed body.

* * * * *